United States Patent
Cho

(10) Patent No.: US 12,499,692 B2
(45) Date of Patent: Dec. 16, 2025

(54) SEAT BELT WEARING DETERMINATION APPARATUS

(71) Applicant: HYUNDAI MOBIS CO., LTD., Seoul (KR)

(72) Inventor: Woong Lae Cho, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 302 days.

(21) Appl. No.: 18/353,420

(22) Filed: Jul. 17, 2023

(65) Prior Publication Data

US 2024/0029452 A1    Jan. 25, 2024

(30) Foreign Application Priority Data

Jul. 19, 2022  (KR) .................... 10-2022-0089106
Jul. 19, 2022  (KR) .................... 10-2022-0089107

(51) Int. Cl.
    *G06V 20/59*    (2022.01)
    *G06V 10/764*   (2022.01)
    *G06V 40/10*    (2022.01)

(52) U.S. Cl.
    CPC ........... *G06V 20/59* (2022.01); *G06V 10/764* (2022.01); *G06V 20/593* (2022.01); *G06V 40/10* (2022.01); *G06V 40/103* (2022.01)

(58) Field of Classification Search
    CPC .... G06V 20/59; G06V 20/593; G06V 10/764; G06V 40/10; G06V 40/103
    See application file for complete search history.

(56) References Cited

U.S. PATENT DOCUMENTS

| | | | |
|---|---|---|---|
| 2022/0144206 A1* | 5/2022 | Wang | B60W 50/14 |
| 2023/0020385 A1* | 1/2023 | Zeng | G06V 40/161 |
| 2023/0095027 A1* | 3/2023 | Yen | G06N 7/01 |
| | | | 382/311 |

FOREIGN PATENT DOCUMENTS

| | | | | |
|---|---|---|---|---|
| CN | 111931642 A | * | 11/2020 | ............. G06F 18/22 |
| KR | 10-2006-0003193 A | | 1/2006 | |
| KR | 10-0844427 B1 | | 7/2008 | |

OTHER PUBLICATIONS

Extended European Search Report issued on Nov. 8, 2023 in regard to the corresponding European patent application No. 23185771.5.

* cited by examiner

*Primary Examiner* — Casey L Kretzer
(74) *Attorney, Agent, or Firm* — NovoTechIP International PLLC

(57) ABSTRACT

Introduced is a seat belt wearing determination apparatus including a camera configured to capture an interior of a vehicle, a controller configured to determine a first bounding box and a second bounding box from an image including a seated occupant captured by the camera and determine whether the seated occupant is wearing a seat belt based on the overlapping degree of the first and second bounding boxes, wherein the first bounding box corresponds to the upper body region of the seated occupant, and the second bounding box includes the seat belt detected from the captured image by the controller.

19 Claims, 9 Drawing Sheets

SEAT BELT WEARING DETERMINATION APPARATUS

CROSS-REFERENCE TO RELATED APPLICATIONS

The present application claims priority to Korean Patent Application No. 10-2022-0089106, filed Jul. 19, 2022 and Korean Patent Application No. 10-2022-0089107, filed Jul. 19, 2022, the entire contents of which are incorporated herein for all purposes by this reference.

TECHNICAL FIELD

The present disclosure relates to a method and apparatus for determining whether a seated occupant is wearing a seat belt based on the video information analysis.

BACKGROUND

Nowadays, most vehicles are equipped with seat belts to ensure the safety of occupants in the event of a vehicle collision. Seat belts, also commonly known as safety belts, play a crucial role in minimizing occupant injuries caused by collisions by preventing occupants from rapidly detaching from the seat and colliding with the vehicle's interior structure or being ejected from the vehicle.

These seat belts restrain the occupant's body to prevent them from detaching from the seat, but this can create a feeling of pressure and discomfort as the occupant senses the restraint caused by the seat belt. As a result, despite the presence of seat belts, there can be a problem of occupants sustaining significant injuries if they choose not to wear the seat belt.

In order to address this issue, various technologies have been developed to encourage occupants to wear seat belts. One example of such technology is to utilize weight information to encourage the wearing of seat belts. This technology determines the presence of occupants by detecting the weight applied to the seating surface via switch sensors mounted on the seat cushion and assesses the fastening status of the seat belt via buckle sensors mounted on the seat belt. This makes it possible to recognize situations where the seat belt is not fastened despite the presence of an occupant and prompts the occupant to fasten the seat belt by sending an alert.

However, this technology can mistakenly recognize the seat belt as fastened when occupants intentionally use additional tools like a Fake Buckle to deceive the sensors or when the seat belt is worn improperly, failing to properly restrain the body, contrary to its intended usage. Therefore, there is a possibility that the functionality for encouraging seat belt wearing may not work effectively, as the system may determine that the seat belt is fastened even when the occupant is not actually wearing it.

The description of the background technology provided above is intended to enhance understanding of the background of the present disclosure and should not be construed as an acknowledgment that it is known prior art to those skilled in this technical field.

SUMMARY

The present disclosure relates to a seat belt wearing determination method and apparatus that aims to accurately determine whether a seated person is wearing a seat belt based on the analysis of video information.

The technical objectives aimed to be achieved in the present disclosure are not limited to the aforesaid, and other technical objects not described herein will be clearly understood by those skilled in the art from the descriptions below.

In order to accomplish the above objects, a seat belt wearing determination apparatus according to an embodiment of the present disclosure includes a camera configured to capture an interior of a vehicle and a controller configured to determine a first bounding box and a second bounding box from an image including a seated occupant captured by the camera and determine whether the seated occupant is wearing a seat belt based on the overlapping degree of the first and second bounding boxes, wherein the first bounding box corresponds to the upper body region of the seated occupant, and the second bounding box includes the seat belt detected from the captured image by the controller.

For example, the controller may detect at least one predetermined point included in the upper body region of the seated occupant from the captured image and determine the first bounding box based on the detected point.

For example, the predetermined point may include points corresponding to both shoulders and abdominal center of an upper body of the seated occupant.

For example, the controller may determine the width of the first bounding box based on the points corresponding to both shoulders and the height of the first bounding box based on at least one of the points corresponding to both shoulders and the point corresponding to the abdominal center.

For example, the controller may derive, in response to part of the at least one predetermined point being undetected, the undetected points based on other detected points and determine the first bounding box by additionally considering the derived points.

For example, the controller may extract seat belt characteristic information from the captured image, obtain classification information from the extracted seat belt characteristic information, and detect the seat belt based on the obtained classification information.

For example, the controller may determine whether the seat belt is worn by comparing the overlapping degree with a predetermined threshold value.

For example, the controller may determine that the seated occupant is not wearing the seat belt in response to the overlapping degree being equal to or less than the predetermined threshold value.

For example, the controller may determine the class of the seated occupant and the first bounding box based on the determined class of the seated occupant.

For example, the controller may obtain a seat position of a seat, determine an area value of the seat based on a parameter associated with the seat position, detect the seated occupant from the captured image, determine an area value of the seated occupant, and determine the class of the seated occupant based on the area ratio between the area values of the seat and the seated occupant on the corresponding seat.

For example, the seat position may include a front-rear direction position of the seat, and the parameter may be preconfigured to correspond at least to the frontmost and rearmost positions of the seat.

For example, the seat position may include a seat back recline angle of the seat, and the controller may determine the area value of the seat considering the recline angle additionally.

For example, the controller may determine the class as a predetermined class in response to the seated occupant being undetected from the captured image.

For example, the controller may obtain seated occupant segmentation from the captured image and determine the area value of the seated occupant based on the obtained seated occupant segmentation.

For example, the controller may compare the area ratio and a predetermined threshold value and determine the class of the seated occupant based on the comparison result.

For example, the controller may determine the class of the seated occupant based on a plurality of classes defined by a range between two adjacent threshold values among a plurality of predetermined threshold values.

For example, the controller may obtain the weight information of the seated occupant and determine the class of the seated occupant based on the additional consideration of the weight information.

For example, the controller may obtain weight information of the seated occupant from a weight sensor connected to the seat.

For example, the controller may determine the area ratio for each of a plurality of seats, and determine the class of the seated occupant for each of the plurality of seats based on the area ratio determined for each seat.

For example, the controller may determine at least one of the first and second bounding boxes or a combination thereof by inputting the captured image to an artificial intelligence algorithm, which includes at least one of machine learning, neural networks, deep learning, classification algorithms, or combinations thereof.

A seat belt wearing determination method, as described in at least one embodiment of the present disclosure, is capable of accurately assessing whether the seat belt is properly worn according to its intended usage by analyzing video information.

Furthermore, by utilizing bounding boxes corresponding to the seated occupant and the seat belt on the video information, it becomes possible to improve the accuracy of video information analysis for seat belt wearing determination and enhance the speed of determination.

By utilizing video information, it is also possible to accurately detect and classify seated occupants with more precision.

By improving the accuracy of seated occupant detection, it is possible to mitigate issues where functionalities installed in the vehicle may malfunction or fail to operate as intended due to incorrect detection.

By refining the classification of seated occupants, the functionalities installed in the vehicle can be customized to accurately reflect the specific characteristics of individual seated occupants, resulting in performance enhancement.

A seat belt wearing determination method, as described in at least one embodiment of the present disclosure, is capable of accurately assessing whether the seat belt is properly worn according to its intended usage by analyzing video information.

Furthermore, by utilizing bounding boxes corresponding to the seated occupant and the seat belt on the video information, it becomes possible to improve the accuracy of video information analysis for seat belt wearing determination and enhance the speed of determination.

By utilizing video information, it is also possible to accurately detect and classify seated occupants with more precision.

By improving the accuracy of seated occupant detection, it is possible to mitigate issues where functionalities installed in the vehicle may malfunction or fail to operate as intended due to incorrect detection.

By refining the classification of seated occupants, the functionalities installed in the vehicle can be customized to accurately reflect the specific characteristics of individual seated occupants, resulting in performance enhancement.

The advantages of the present disclosure are not limited to the aforesaid, and other advantages not described herein may be clearly understood by those skilled in the art from the descriptions below.

DETAILED DESCRIPTION

Figure 1:
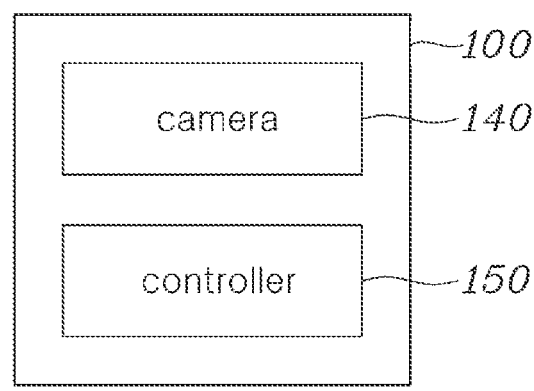
FIG. 1 is a block diagram illustrating a configuration of a seat belt wearing determination apparatus according to an embodiment of the present disclosure.

The specific structural or functional descriptions of the embodiments of the disclosure disclosed in this specification or patent application are illustrative examples intended to describe embodiments of the present disclosure, and the embodiments of the present disclosure can be implemented in various forms and should not be construed as being limited to those described in this specification or the application.

The embodiments according to the present disclosure can be subject to various modifications and can take on different forms, so specific embodiments are illustrated in the drawings and described in detail in this specification or the application. However, this should not be construed as limiting the embodiments of the disclosure to specific disclosed form, but rather should be understood to encompass all modifications, equivalents, or substitutes that fall within the scope of the concept and technological scope of the disclosure.

Unless otherwise defined, all terms used herein, including technical or scientific terminology, have the same meaning as commonly understood by those skilled in the art to which the disclosure belongs. It will be further understood that terms, including those defined in commonly used dictionaries, should be interpreted in a manner consistent with their meaning in the context of the relevant field and should not be interpreted in an idealized or overly formal sense unless explicitly defined in this specification.

Hereinafter, descriptions are made of the embodiments disclosed in the present specification with reference to the accompanying drawings in which the same reference numbers are assigned to refer to the same or like components and redundant description thereof is omitted.

As used in the following description, the suffix "module" and "unit" are granted or used interchangeably in consideration of easiness of description but, by itself, having no distinct meaning or role.

In addition, detailed descriptions of well-known technologies related to the embodiments disclosed in the present specification may be omitted to avoid obscuring the subject matter of the embodiments disclosed in the present specification. In addition, the accompanying drawings are only for easy understanding of the embodiments disclosed in the present specification and do not limit the technical spirit disclosed herein, and it should be understood that the embodiments include all changes, equivalents, and substitutes within the spirit and scope of the disclosure.

As used herein, terms including an ordinal number such as "first" and "second" can be used to describe various components without limiting the components. The terms are used only for distinguishing one component from another component.

It will be understood that when a component is referred to as being "connected to" or "coupled to" another component, it can be directly connected or coupled to the other component or intervening component may be present. In contrast, when a component is referred to as being "directly connected to" or "directly coupled to" another component, there are no intervening components present.

As used herein, the singular forms are intended to include the plural forms as well, unless the context clearly indicates otherwise.

It will be further understood that the terms "comprises" or "has," when used in this specification, specify the presence of a stated feature, number, step, operation, component, element, or a combination thereof, but they do not preclude the presence or addition of one or more other features, numbers, steps, operations, components, elements, or combinations thereof.

For example, each controller may include a communication device communicating with another controller or sensor to control a function in charge, a memory that stores operating system or logic instructions and input/output information, and one or more processors for determination, operation, and decision-making necessary for functions in charge.

The embodiments of the present disclosure propose a video information analysis-based seat belt wearing determination method and apparatus that is capable of more accurately determining whether the seat belt is worn and assessing whether the seat belt is properly worn according to its intended usage based on bounding boxes corresponding to the seated occupant and the seat belt.

Before explaining the seat belt wearing determination method according to the present disclosure, a description is made of the seat belt wearing determination apparatus according to an embodiment of the present disclosure with reference to FIG. 1.

FIG. 1 is a diagram illustrating the configuration of a seat belt wearing determination apparatus according to an embodiment of the present disclosure.

With reference to FIG. 1, the seat belt wearing determination apparatus 100 according to one embodiment may include a camera 140 and a controller 150. FIG. 1 primarily illustrates the components related to the embodiments of the present disclosure, and it is obvious to those skilled in the art that the actual implementation of the determination apparatus 100 may include additional components beyond those depicted in the drawing. Hereinafter, each component will be described.

First, the camera 140 serves to capture the interior of the vehicle and transmit the captured images to the controller 150 and other devices. For the purpose of facilitating seat belt 10 wearing determination, it is preferable for the camera 140 to be positioned in the front of the vehicle, facing towards the rear, to ensure effective capture of the frontal view of the seated occupants. In this case, the camera 140 capturing an image of the interior of the vehicle may be implemented as an in-cabin camera. Meanwhile, an in-cabin camera, when implemented as the camera 140, is installed inside the vehicle and allows real-time monitoring of the seated occupant's condition, facilitating continuous monitoring of whether the seat belt 10 is worn by utilizing the continuously provided images.

Meanwhile, the controller 150 acquires images containing seated occupants from the camera 140 and determines whether the seated occupants are wearing the seat belt 10 based on these images. The controller 150 determines the first bounding box 210 and the second bounding box 220 from the acquired images and, based on the overlapping ratio between the determined bounding boxes, it determines whether the seated occupant is wearing the seat belt 10. In this case, the first bounding box 210 corresponds to the upper body area of the seated occupant in the acquired image, while the second bounding box 220 encompasses the detected seat belt 10 from the acquired image. The detailed description of how the controller 150 determines whether the seated occupant is wearing the seat belt 10 is provided with reference to FIGS. 2 and 3.

Figure 2:
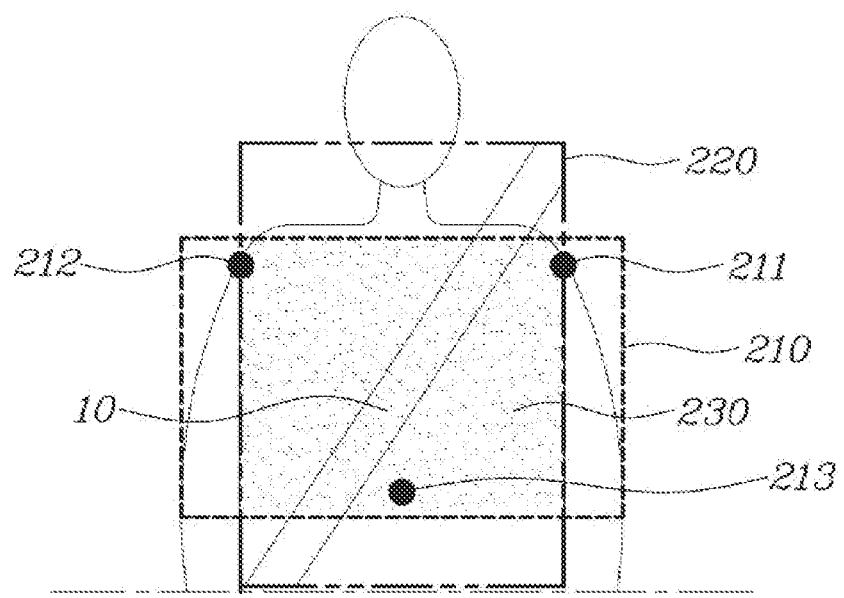
FIG. 2 is a diagram describing a process of deriving an overlapping ratio between bounding boxes for seat belt wearing determination according to an embodiment of the present disclosure.

FIG. 2 is a diagram describing the process of deriving the overlapping ratio between bounding boxes for seat belt wearing determination according to an embodiment of the present disclosure.

With reference to FIG. 2, the image obtained from the camera 140 shows a seated occupant, a seat belt 10, a first bounding box 210, a second bounding box 220, and an overlapping region 230.

First, a description is made of the process of determining the first bounding box 210 corresponding to the upper body region of the seated occupant from the acquired image. The controller 150 may detect at least one preset point from the acquired image, which is included in the upper body region of the seated occupant, to determine the first bounding box 210. In this case, each point may be preset to correspond to predetermined locations on the upper body of the seated occupant in the image, such as the left shoulder 211, right shoulder 212, and abdominal center 213 in order to ensure that the first bounding box 210 captures the upper body region of the seated occupant.

The controller 150 may determine the first bounding box 210 based on the detected points. In particular, when the points corresponding to both shoulders 211 and 212 and the abdominal center 213 of the seated occupant in the acquired image are detected, the width of the first bounding box 210 may be determined based on the points corresponding to the left and right shoulders 211 and 212. Furthermore, the height of the first bounding box 210 may be determined based on at least one of the points corresponding to the shoulders 211 and 212 as well as the point corresponding to the abdominal center 213. For example, the controller 150 may determine the horizontal distance between the points corresponding to the shoulders 211 and 212 as the width of the first bounding box 210, and the vertical distance between the points corresponding to the shoulders 211 and 212 and the abdominal center 213 as the height of the first bounding box 210. By determining the first bounding box 210 in this way, it is possible to prevent the first bounding box 210 from being determined excessively small or large compared to the upper body region of the seated occupant in the image, thus ensuring that the first bounding box corresponds appropriately to the upper body region of the seated occupant.

Meanwhile, when the seated occupant's upper body is partially obscured due to the seated occupant's posture or other obstacles, some of the predetermined points may not be detected from the acquired image. In such cases, the controller 150 may derive the undetected points based on the remaining detected points and determine the first bounding box 210 by considering both the derived points and the detected points. For example, when the point corresponding to the left shoulder 211 of the seated occupant is obscured and not detected, the controller 150 may derive a point corresponding to the left shoulder 211 by calculating the horizontal distance between the points corresponding to the abdominal center 213 or the sternum and the right shoulder 212, and then shifting horizontally from the point corresponding to the abdominal center 213 or the sternum in the left direction by the calculated horizontal distance, assuming that the shoulders are symmetrical. In addition to the aforementioned methods, it is also possible to derive undetected points by utilizing stored or separately received human body information.

Meanwhile, the controller 150 may detect the seat belt 10 from the acquired image and determine the second bounding box 220 including the detected seat belt 10. To accomplish this, the controller 150 may extract the feature information of the seat belt 10 from the acquired image, obtain classification information from the extracted feature information, and detect the seat belt based on the obtained classification information. In this case, the feature information of the seat belt 10 may include attributes such as color, shape, and position, and the obtained classification information may facilitate the differentiation between the seat belt 10 and other objects in the image.

Meanwhile, the determination of the first bounding box 210 and the second bounding box 220 may be performed by inputting the acquired image into a designated artificial intelligence learning model. Here, the artificial intelligence learning model may include at least one of machine learning, neural networks, deep learning, classification algorithms, or combinations thereof, as artificial intelligence algorithms.

In particular, human pose estimation of the artificial intelligence learning model may be utilized in determining the first bounding box 210. Human pose estimation is the process of detecting multiple key points corresponding to important body parts of a person and using them to estimate the pose of the subject, and in an embodiment of the present disclosure, the detected key points belonging to the upper body of the seated occupant may be used as points for determining the first bounding box 210. Furthermore, in the detection of the seat belt 10, the classification of the artificial intelligence learning model may be utilized to improve the detection accuracy, and the bounding box regression of the artificial intelligence learning model may be employed to compensate the first bounding box 210 and the second bounding box 220 to have more accurate values.

Once the first bounding box 210 and the second bounding box 220 are determined through this process, the controller 150 may assess a degree of overlapping between the first and second bounding boxes 210 and 220. Here, the overlapping degree may be determined based on the area of the region 230 that is included in both the first bounding box 210 and the second bounding box 220 on the acquired image.

By analyzing the images obtained through the camera 140, as described in FIG. 2, it is possible to determine that the seat belt 10 is not worn, even if the buckle sensors indicate that the seat belt is worn, when the seated occupant is not actually wearing the seat belt 10. This serves to encourage the actual utilization of the seat belt 10.

Meanwhile, when using image segmentation to determine the use of the seat belt 10 based on the region of the seat belt 10 in the acquired image, a significant amount of information, equivalent to the number of pixels in the image, is required, which may potentially overload the controller 150. On the other hand, according to the embodiments of the present disclosure, by utilizing the first bounding box 210 and the second bounding box 220, it becomes possible to determine the use of the seat belt 10 based solely on the information of the four corner points of the bounding boxes and the width and height information. By doing so, it is possible to reduce the amount of information required for the determination and improve the speed of the determination process.

Hereinafter, the process of determining the usage of the seat belt 10 based on the calculated overlapping degree, as described above, will be described with reference to FIG. 3.

Figure 3:
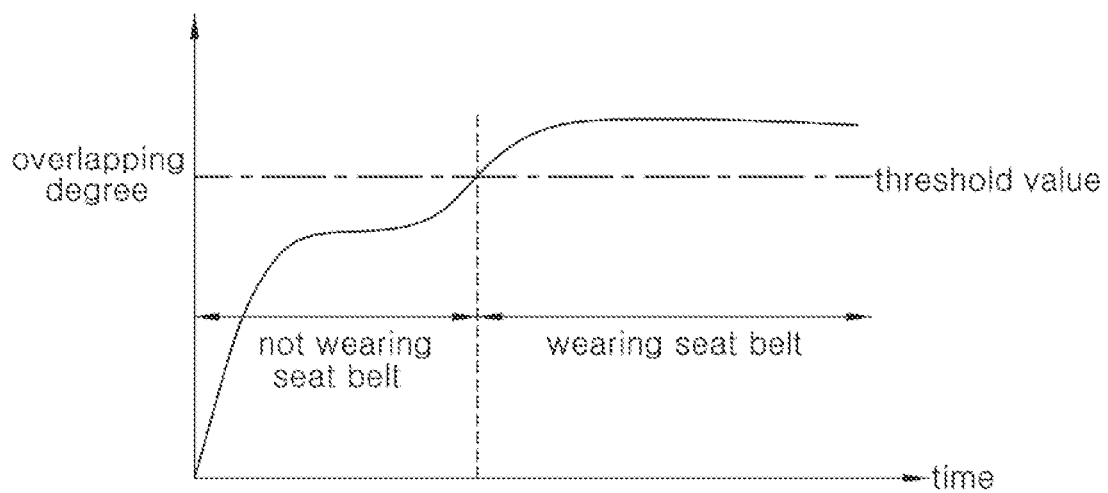
FIG. 3 is a diagram describing a method of determining seat belt wearing based on an overlapping ratio according to an embodiment of the present disclosure.

FIG. 3 is a diagram for describing a method of determining seat belt wearing based on an overlapping ratio according to an embodiment of the present disclosure.

FIG. 3 shows a graph with the overlapping degree as the vertical axis and time as the horizontal axis to illustrate the method of determining seat belt wearing according to an embodiment. The depicted graph shows a schematic representation without precise values to aid understanding.

Firstly, it can be observed from the graph that the overlapping degree does not have a fixed value but varies. Although the overlapping degree is not determined by time, the movements of the seated occupant, who is not a stationary object, may cause variations in the regions of the seated occupant and the seat belt 10 as they appear in the image, resulting in changes in the overlapping degree of the first bounding box 210 and the second bounding box 220.

In an embodiment of the present disclosure, the determination of seat belt wearing involves the camera 140 continuously capturing images of the seated occupant and transmitting the captured images to the controller 150 in real-time, allowing the controller 150 to assess whether the seated occupant is wearing the seat belt 10 based on the received images. By doing so, it becomes possible to continuously monitor whether the seated occupant is wearing the seat belt 10, as depicted on the graph.

Meanwhile, the controller 150 may compare the overlapping degree of the first and second bounding boxes 210 and 220 with a predetermined threshold value and determine whether the seat belt 10 is worn based on the comparison result.

In this case, the first bounding box corresponds to the upper body region of the seated occupant, while the second bounding box encompasses the seat belt 10, resulting in a higher probability of the seated occupant wearing the seat belt 10 as the overlapping degree increases. Based on this, the controller 150 may determine that the seated occupant is wearing the seat belt 10 in response to the overlapping degree greater than the predetermined threshold value and that the seated occupant is not wearing the seat belt 10 in response to the overlapping degree equal to or less than the predetermined threshold value.

Figure 4:
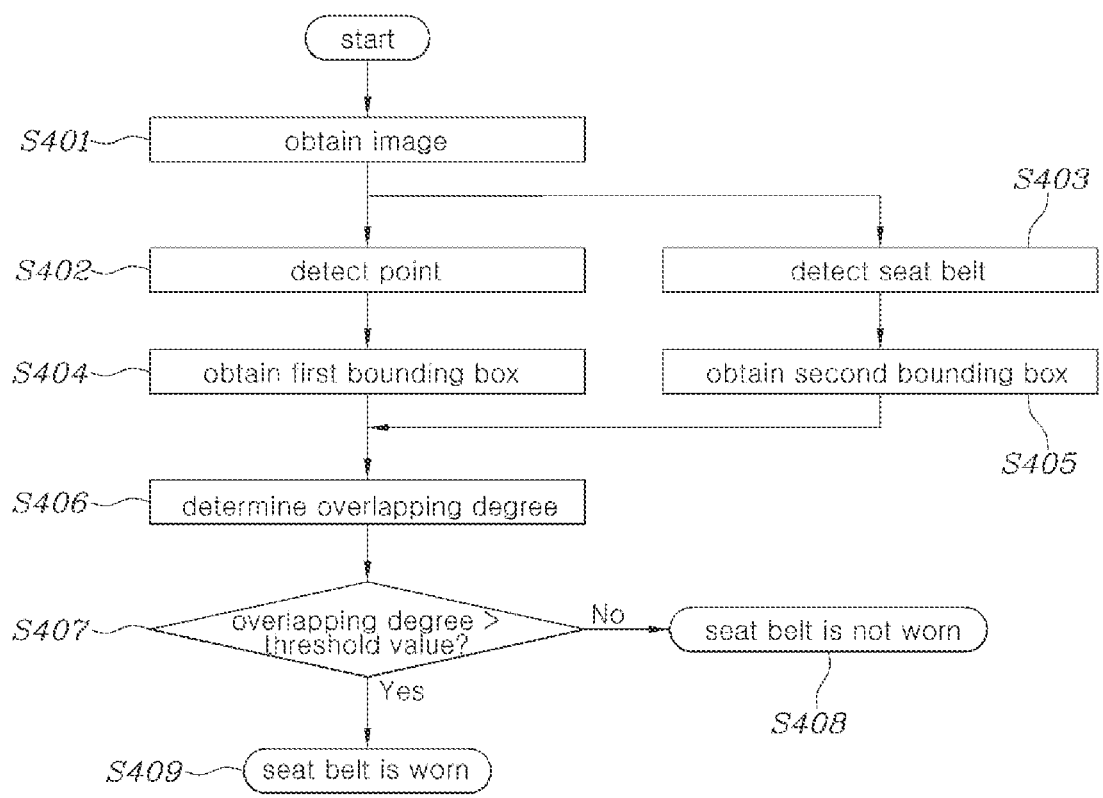
FIG. 4 is a flowchart of a seat belt wearing determination method according to an embodiment of the present disclosure.

The process described above is represented by the flowchart shown in FIG. 4. Hereinafter, the method for determining the wearing status of the seat belt 10, according to an embodiment of the present disclosure, is described with reference to FIG. 4.

FIG. 4 is a flowchart of a seat belt wearing determination method according to an embodiment of the present disclosure.

With reference to FIG. 4, the camera 140 captures images of the interior of the vehicle, including the seated occupant, and the controller 150 acquires the captured images at step S401. Here, for the purpose of facilitating seat belt 10 wearing determination, it is preferable for the camera 140 to be positioned in the front of the vehicle, facing towards the rear, to ensure effective capture of the frontal view of the seated occupants. In this case, the camera 140 capturing the interior of the vehicle may be implemented as an in-cabin camera. The in-cabin camera, when implemented as the camera 140, is installed inside the vehicle and allows real-time monitoring of the seated occupant's condition, facilitating continuous monitoring of whether the seat belt 10 is worn by utilizing the provided images.

At step S402, the controller 150, having acquired the images, may detect at least one preset point from the upper body region of the seated occupant in the acquired image to determine the first bounding box 210. In this case, each point may be preset to correspond to predetermined locations on the upper body of the seated occupant in the image, such as the left shoulder 211, right shoulder 212, and abdominal center 213 in order to ensure that the first bounding box 210 captures the upper body region of the seated occupant.

Next, the controller 150 determines, at step S404, the first bounding box 210 based on the detected points. In this case, when the detected points correspond to both shoulders 211 and 212 and the abdominal center of the upper body of the seated occupant, the width of the first bounding box 210 may be determined based on the points corresponding to the left and right shoulders 211 and 212, and the height of the first bounding box 210 may be determined based on at least one of the points corresponding to both shoulders 211 and 212 and the point corresponding to the abdominal center 213. For example, the controller 150 may determine the horizontal distance between the points corresponding to the shoulders 211 and 212 as the width of the first bounding box 210, and the vertical distance between the points corresponding to the shoulders 211 and 212 and the abdominal center 213 as the height of the first bounding box 210. By the controller 150 determining the first bounding box 210 in this way, it is possible to prevent the first bounding box 210 from being determined excessively small or large compared to the upper body region of the seated occupant in the image, thus ensuring that the first bounding box corresponds appropriately to the upper body region of the seated occupant.

Meanwhile, when the seated occupant's upper body is partially obscured due to the seated occupant's posture or other obstacles, some of the predetermined points may not be detected from the acquired image. In such cases, the controller 150 may derive the undetected points based on the other detected points and determine the first bounding box 210 by considering both the derived points and the detected points. For example, when the point corresponding to the left shoulder 211 of the seated occupant is obscured and not detected, the controller 150 may derive a point corresponding to the left shoulder 211 by calculating the horizontal distance between the points corresponding to the abdominal center 213 or the sternum and the right shoulder 212, and then shifting horizontally from the point corresponding to the abdominal center 213 or the sternum in the left direction by the calculated horizontal distance, assuming that the shoulders are symmetrical. In addition to the aforementioned methods, it is also possible to derive undetected points by utilizing stored or separately received human body information.

The controller 150 also detects the seat belt 10 from the acquired images at step S403 to determine the second bounding box 220. The controller 150 may extract the feature information of the seat belt 10 from the acquired image, obtain classification information from the extracted feature information, and detect the seat belt based on the obtained classification information. In this case, the feature information of the seat belt 10 may include attributes such as color, shape, and position, and the obtained classification information may facilitate the differentiation between the seat belt 10 and other objects in the image.

Upon detecting the seat belt 10, the controller 150 determines, at step S405, the second bounding box that encompasses the detected seat belt 10, and in this case, it is appropriate for the second bounding box to be determined as a rectangular area with the smallest possible area that includes the seat belt 10.

Meanwhile, the above-described process of steps S402 to S405 may be performed by inputting the acquired images into a designated artificial intelligence learning model. Here, the artificial intelligence learning model may include at least one of machine learning, neural networks, deep learning, classification algorithms, or combinations thereof, as artificial intelligence algorithms. In particular, human pose estimation of the artificial intelligence learning model may be utilized in determining the first bounding box 210. Human pose estimation is the process of detecting multiple key points corresponding to important body parts of a person and using them to estimate the pose of the subject, and in an embodiment of the present disclosure, the detected key points belonging to the upper body of the seated occupant may be used as points for determining the first bounding box 210. Furthermore, in the detection of the seat belt 10, the classification of the artificial intelligence learning model may be utilized to improve the detection accuracy, and the bounding box regression of the artificial intelligence learning model may be employed to compensate the first bounding box 210 and the second bounding box 220 to have more accurate values.

Once the first bounding box 210 and the second bounding box 220 are determined, the controller 150 may assess the overlapping degree between the two boxes 210 and 220 at step S406 and, based on this overlapping degree, determine whether the seated occupant is wearing the seat belt 10. Here, the overlapping degree may be determined based on the area of the region 230 that is included in both the first bounding box 210 and the second bounding box 220 on the acquired image.

The controller 150 may determine the wearing status of the seat belt 10 by comparing the overlapping degree with a predetermined threshold value, i.e., determine at step S409 that the seated occupant is wearing the seat belt 10 in response to the overlapping degree greater than the threshold value (Yes at step S407) and at step S408 that the seated occupant is not wearing the seat belt 10 in response to the overlapping degree equal to or less than the threshold value (No at step S407).

Meanwhile, according to an embodiment of the present disclosure, the process of classifying the seated occupant may be involved in determining the seat belt wearing status. In particular, in an embodiment of the present disclosure, it is proposed to enhance the detection accuracy of the seated occupant by utilizing image information to detect the occupant based on the relative area of the seat according to the seat position and the occupant area in the image, thereby enabling a more detailed classification of the seated occupant types.

Before explaining the seated occupant classification method according to an embodiment of the present disclosure, the configuration of the seat belt wearing determination apparatus according to an embodiment of the present disclosure will be described first with reference to FIG. 5.

Figure 5:
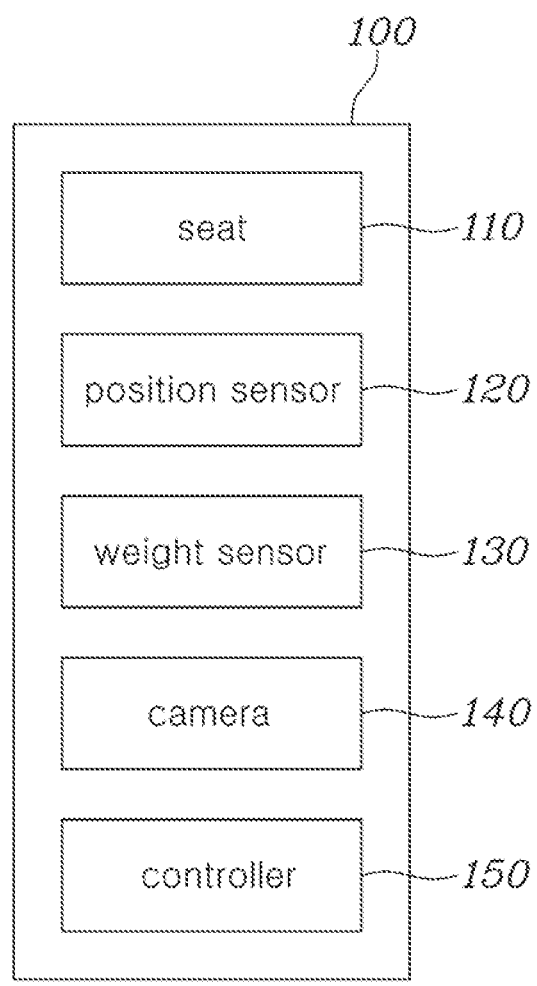
FIG. 5 is a block diagram illustrating a configuration of a seat belt wearing determination apparatus according to another embodiment of the present disclosure.

FIG. 5 is a block diagram illustrating a configuration of a seat belt wearing determination apparatus according to another embodiment of the present disclosure.

With reference to FIG. 5, the seat belt wearing determination apparatus 100 according to an embodiment may include a camera 140, a controller 150, a seat 110, a position sensor 120, and a weight sensor 130. FIG. 5 primarily illustrates the components related to the embodiments of the present disclosure, and it is obvious to those skilled in the art that the actual implementation of the seat belt wearing determination apparatus 100 may be implemented with more or fewer components. Hereinafter, a description is made of each component.

First, the seat belt wearing determination apparatus 100, according to an embodiment, includes at least one seat 110, and the seat 110 may be distinguished based on the seating positions such as the driver's seat 111 and the front passenger seat 112. Meanwhile, in an embodiment of the present disclosure, the seat 110 may be adjustable in position. The seat's position may include at least one of the position in the driving direction and a direction parallel to the driving direction of the seat 110 arranged on the driver's seat 111, front passenger seat 112, and the seat back angle. Here, seat's position may refer to the state of the seat 110, which includes the location of the seat 110 within a certain range achieved by moving the seat forward and backward via a mechanism such as seat tracks. In addition, seat back angle may refer to the angle of the seat back in relation to the seating surface or the ground, varying in the recline or relax mode of the seat 110.

Meanwhile, according to an embodiment of the present disclosure, the seat belt wearing determination apparatus 100 may further include the position sensor 120 connected to the seat to detect the seat's position. For example, the position sensor 120 may include a seat track position sensor that detects the forward and backward position of the seat 110 on the seat track. By utilizing such a position sensor 120, the position of the seat 110 may be detected more accurately, facilitating seated occupant classification. Moreover, by continuously monitoring the changes in a position of the seat 110 through the position sensor 120, it becomes possible to update the seated occupant classification based on these variations.

Furthermore, according to an embodiment of the present disclosure, the seat belt wearing determination apparatus 100 may include the weight sensor 130 connected to the seat 110 to detect the weight applied to the seat 110 and produce weight information of the seated occupant. The weight sensor 130 may be implemented through an occupant classification system (OCS) or an occupant detection system (ODS). When equipped with the weight sensor 130, seat belt wearing determination apparatus 100 may utilize weight information in addition to image information to improve the accuracy of occupant classification.

Meanwhile, the camera 140 captures the interior of the vehicle and performs the function of transmitting the captured images. The images captured by the camera 140 may include at least one seat 110 or a seated occupant along with the seat 110. Furthermore, it is appropriate for the camera 140 to be equipped in the front of the vehicle's interior to face the rear, allowing for a clear representation of the front of the seat 110 and the seated occupant. For example, the camera 140 can be implemented as an in-cabin camera. Additionally, the in-cabin camera is capable of real-time monitoring of the occupants' status within the vehicle, allows seat belt wearing determination apparatus 100, according to an embodiment of the present disclosure, to continuously monitor the entry and exit of occupants as well as any changes using real-time images.

The images captured by the camera 140 may include the seat 110 and the seated occupant, and when the seat 110 undergoes changes in position, such as moving forward or backward or reclining, while the camera 140 remains fixed, there will be noticeable variations in the area occupied by the seat 110 within the captured images. Even though the changes in position do not affect the actual area of the seat 110 itself, when the seat 110 is positioned in the front compared to the rear, the seat 100 will be closer to the camera 140, resulting in a larger area occupied in the captured images. Furthermore, when the seat back has a smaller recline angle, it will occupy a larger area in the captured images compared to when the seat back has a larger recline angle. Therefore, considering the position of the seat 110 when determining the area of the seat in the captured images may lead to more accurate results.

Meanwhile, the controller 150 may obtain the seat position from the position sensor 120 and acquire the images of the vehicle interior from the camera 140.

The controller 150 may determine the seat area value based on parameters associated with the seat position, e.g., by extracting the parameters corresponding to the current position of the seat 110 from the acquired seat position and using the parameters to determine the seat area. Here, the area value of the seat 110 may represent the area of the seat 110 in the image rather than the actual physical area of the seat 110.

Furthermore, the controller 150 may detect seated occupants from the acquired interior image of the vehicle and determine the area value corresponding to the detected seated occupants.

Once the area value of the seat 110 and the area value of the seated occupant on that seat have been determined, the controller 150 may assess the area ratio between them and classify the seated occupant's class or type based on the area ratio. Here, the area ratio may be determined by dividing the area value of the seated occupant by the area value of the seat, which means that a higher ratio corresponds to a relatively larger seated occupant, while a lower ratio suggests a relatively smaller seated occupant.

The change in position of the seat 110 may change not only the area value of the seat 110 but also the area value of the seated occupant within the image for the same occupant because of the influence on the distance and angle between the seat and the camera. Therefore, in the case of considering only the area of the seated occupant, the area value of the seated occupant within the image may vary depending on the position of the seat 110, making it difficult to classify the seated occupant based on a fixed criterion. On the other hand, determining the class of the seated occupant based on the above-described area ratio allows the maintenance of a consistent classification criterion and enhances the precision of seated occupant classification.

Hereinafter, descriptions are made of the determination of the area values of the seat 110 and the seated occupant and the classification of the seated occupant based on the area ratio in detail with reference to FIGS. 6 to 8.

Figure 6:
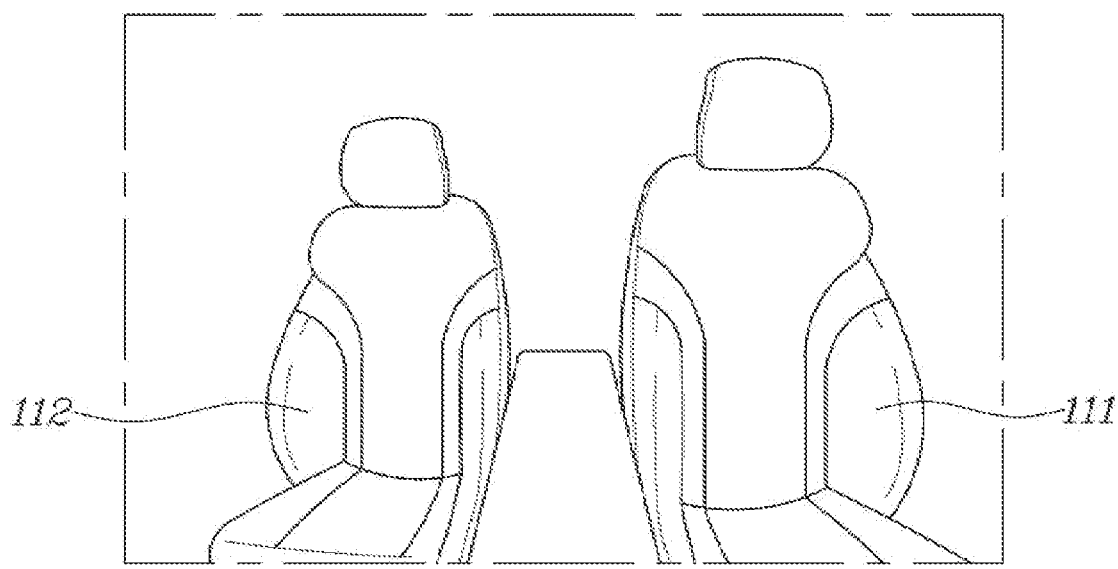
FIG. 6 is a diagram representing an image of the interior of a vehicle with seat belts according to an embodiment of the present disclosure.

FIG. 6 is a diagram illustrating an image of the interior of a vehicle including a seat according to an embodiment of the present disclosure.

With reference to FIG. 6, the image shows a driver's seat 111 and a front passenger seat 112. It can be observed that although the actual sizes of the driver's seat 111 and the front passenger seat 112 are the same, the driver's seat 111 occupies a larger area in the image compared to the front passenger seat 112. This is because the driver's seat 111 is positioned more towards the front, closer to the camera 140, compared to the front passenger seat 112. Taking these factors into consideration, the controller 150 acquires the position of the seat 110 and determines the area value of the seat 110 based on the associated parameters.

Here, the parameters, which are used to determine the area value of the seat 110 based on the position of the seat 110, are preferably set to ensure that the area value of the seat 110 increases in response to the seat 110 being positioned towards the front and decreases in response to the seat 110 being positioned towards the rear. In this case, the parameters may be configured to correspond at least to the frontmost and rearmost positions of the seat 110, allowing the controller 150 to determine the area value of the seat 110 based on its front and rear positions.

The seat's position may include not only the front and rear positions of the seat 110 but also the seat back recline angle. In this case, by considering the seat back recline angle in addition to the front and rear positions of the seat 110, the controller 150 may determine the area value of the seat 110 more accurately based on the area occupied by the seat 110 in the actual image.

The area value of the seat 110 has been described in relation to the position of the seat 110 in the present disclosure with reference to FIG. 6, and a description is made of the determination of the area value of the seated occupant hereinafter with reference to FIG. 7.

Figure 7:
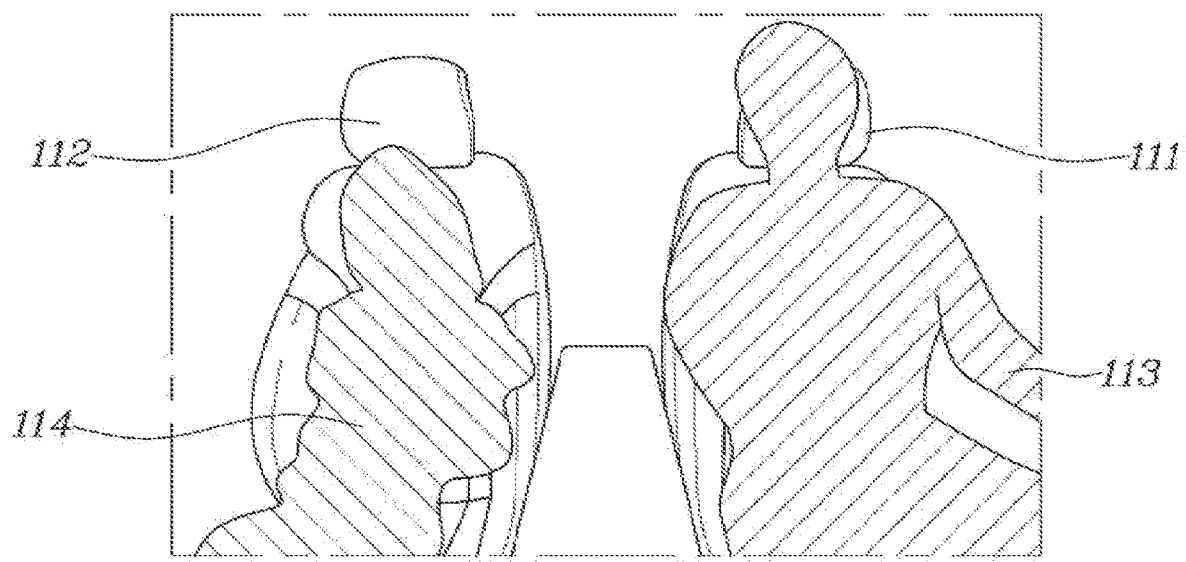
FIG. 7 is a diagram illustrating determination of seated occupant area values for classifying seated occupants according to an embodiment of the present disclosure.

FIG. 7 is a diagram illustrating the determination of the area value of the seated occupant for classifying seated occupants according to an embodiment of the present disclosure.

FIG. 7 shows an interior image of a vehicle that includes the seat 110 and the seated occupant. The controller 150 detects the seated occupant from the acquired image and determines the area value of the detected seated occupant.

Here, the detection of the seated occupant refers to recognizing the seated occupant appearing in the image, which may be done through an artificial intelligence learning model. The artificial intelligence learning model may specifically include deep learning. When using deep learning, the seated occupant may be set as a region of interest (ROI), and the detection of the seated occupant may be performed through ROI-based exploration.

In order to perform ROI exploration, labeled learning data, which includes images along with corresponding class information and location information, is prepared. In an embodiment of the present disclosure, images of seated occupants along with their corresponding classes (such as adult, child, etc.) and the positions of the seated occupants in the images may be prepared. During the deep learning process, the learning model learns the features of the seated occupants based on this information, and iterative learning may be performed to improve accuracy. After the learning process using deep learning, the learned model may receive an image, such as the one shown in FIG. 7, and explore the image to identify regions that satisfy the learned features of a seated occupant. When finding a region that satisfies the features of a seated occupant, the learned model may detect that region as a seated occupant.

When failing to detect a seated occupant, the controller 150 may infer that there is no occupant on the seat 110 and classify the state as an 'unoccupied state' or 'Empty' class, for example. Especially when the acquired image contains a plurality of seats 110 and some of these seats 110 have no occupants, it may be possible to determine which seats 110 have occupants and which seats 110 do not have occupants.

Meanwhile, the area value of the seated occupant may be determined by seated occupant segmentation. For this purpose, the controller 150 may obtain seated occupant segmentation from the acquired image and determine the area value of the seated occupant based on it. Here, segmentation refers to the process of separating objects appearing in an image into different categories, and it involves partitioning the image at the pixel level based on the meaning associated with each region. In an embodiment of the present disclosure, segmentation refers to the separation of regions corresponding to seated occupants from regions that do not correspond to seated occupants, and seated occupant segmentation may be understood as the process of isolating the areas in the image that correspond to seated occupants. By utilizing seated occupant segmentation, the area occupied by the seated occupant in the image may be more precisely identified, thereby improving the accuracy of determining the area value of the seated occupant in the image. Such seated occupant segmentation may be performed by an artificial intelligence learning model, which refers to an artificial intelligence algorithm that includes at least one of machine learning, neural networks, deep learning, classification algorithms, or their combinations.

Meanwhile, with reference to FIG. 7, the acquired image may contain a plurality of seats 110. In this case, the controller 150 may determine the area ratio based on the area values of each seat 110 and the corresponding seated occupant and, based on this information, determine the class of the seated occupant for each seat separately. For example, in the acquired image, which includes a driver's seat 111 and a front passenger seat 112, with the driver 113 and the front passenger 114 seated, the controller 150 may independently determine the area values of the driver's seat 111 and the front passenger seat 112 as well as area values of the seated occupants, i.e., the driver 113 and the front passenger 114. Then, the area ratio for the driver's seat 111 is determined by dividing the area value of the driver 113 by the area value of the driver's seat, while the area ratio for the front passenger seat 112 is determined by dividing the area value of the front passenger 114 by the area value of the front passenger seat. Afterwards, the controller 150 determines the class of the driver 113 and the front passenger 114 based on the determined area ratios for each. Contrary to what is described with reference to FIG. 3, assuming that there is no front passenger 114 in the vehicle, the process of determining the class of the driver 113 is performed in the same way as before. The controller 150 may determine the class of the seated occupant as a specific class such as 'unoccupied state' or 'Empty' in response to no occupant being detected on the front passenger seat 112 or the area value of the seated occupant being 0.

The process of deriving the area values of the seat 110 and the seated occupant for the classification of seated occupants has been described with reference to FIGS. 6 and 7, and hereinafter, a description is made of the process of determining the class of the seated occupant based on the derived area values hereinafter with reference to FIG. 8.

Figure 8:
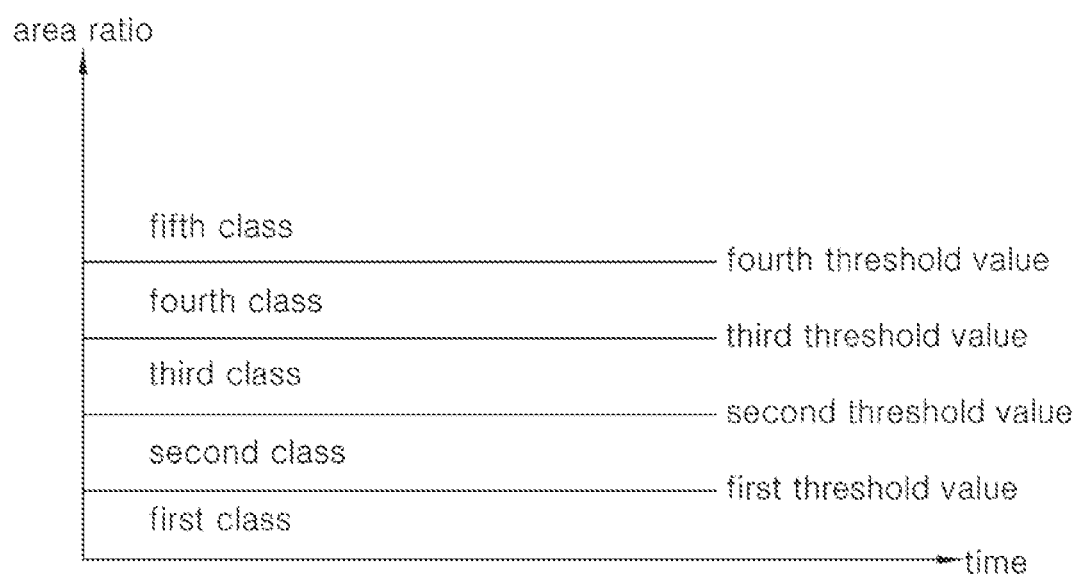
FIG. 8 is a diagram illustrating classification of seated occupants based on area ratios and threshold values according to an embodiment of the present disclosure.

FIG. 8 is a diagram illustrating the classification of seated occupants based on area ratios and threshold values according to an embodiment of the present disclosure.

FIG. 8 shows a graph where one axis represents time and the other axis represents the area ratio. Here, the area ratio refers to the ratio between the area values of the seat 110 and the seated occupant, as described above, and the threshold values may be understood as the criteria for dividing the range of the area ratio into different sections. The threshold values are predefined values that may include one or more thresholds, and the class of the seated occupant may be determined for each section formed by at least one threshold value. When the first to fourth threshold values are taken as an example, as shown in FIG. 8, five sections are formed on the graph. Through this, the controller 150 may determine the class of the seated occupant as the first class for the area ratios less than the first threshold value, the second class for area ratios equal to or greater than the first threshold value but less than the second threshold value, the third class for area ratios equal to or greater than the second threshold value but less than the third threshold value, the fourth class for area ratios equal to or greater than the third threshold value but less than the fourth threshold value, and the fifth class for area ratios equal to or greater than the fourth threshold value. Assuming that the area ratio is defined by dividing the area value of the seated occupant by the area value of the seat, a higher area ratio indicates a relatively larger size of the seated occupant, which means that the occupants classified as the first class may represent the smallest individuals or an unoccupied state while the occupants classified as the fifth class may represent relatively larger individuals. For example, the seated occupants may be classified as shown in Table 1.

TABLE 1

| Section | Class | Seated occupant |
|---|---|---|
| Area ratio < first threshold value | First class | Large |
| First threshold value ≤ area ratio < second threshold value | Second class | Medium |
| Second threshold value ≤ area ratio < third threshold value | Third class | Small |
| Third threshold value ≤ area ratio < fourth threshold value | Fourth class | Child |
| Fourth threshold value ≤ area ratio | Fifth class | Empty |

Figure 9:
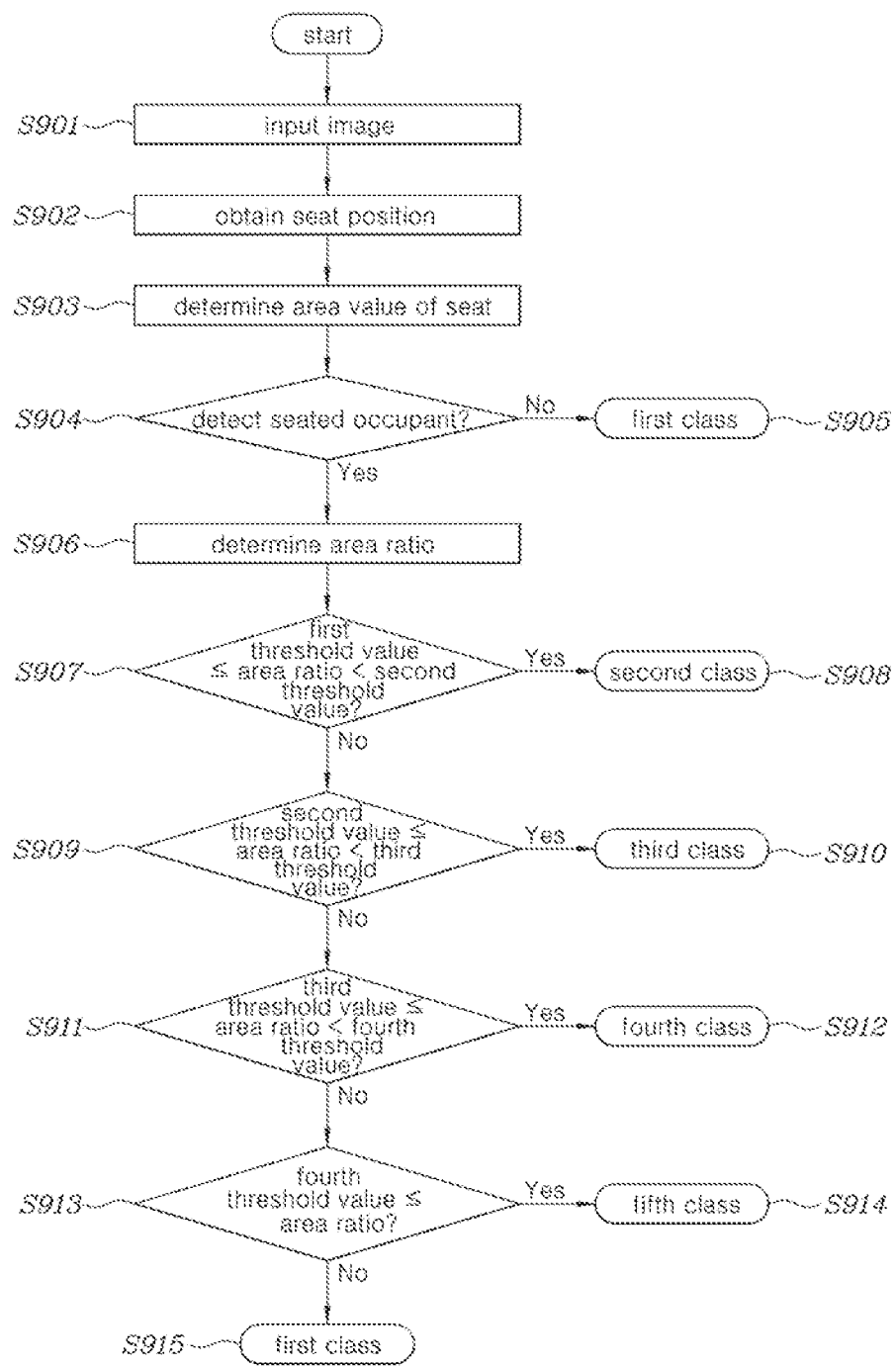
FIG. 9 is a flowchart illustrating a process of seated occupant classification in a seat belt wearing determination method according to an embodiment of the present disclosure.

Hereinafter, a description is made of the sequence of the seated occupant classification process according to the embodiments of the present disclosure with reference to FIG. 9. FIG. 9 is a flowchart illustrating the sequence of the method for classifying seated occupants in a vehicle according to an embodiment of the present disclosure.

With reference to FIG. 9, the image of the vehicle interior captured by the camera 140 is first input to the controller 150 at step S901. At step S902, the controller 150 also obtains the position of the seat 110, including the forward and backward position of the seat 110 and the recline angle of the seat back, from sensors such as the seat track position sensor 120.

On the basis of the position of the seat 110, the controller 150 determines the area value of the seat 110 at step S903.

In this case, the area value of the seat 110 is determined based on the parameters associated with the position of the seat 110, and these parameters may be predefined to correspond at least to the frontmost and rearmost positions of the seat 110. Additionally, the controller 150 may further consider the recline angle of the seat back to determine the area value of the seat 110 and, in this case, the parameters may be configured to be associated with the recline angle of the seat back as well.

Next, the controller 150 detects the seated occupant from the acquired image at step S904. In this case, when no seated occupant is detected (No at step S904), the controller 150 may determine the class of the seated occupant as a specific class such as the first class at step S905. When a seated occupant is detected (Yes at step S904), the controller 150 determines the area ratio at step S906 based on the area value of the seat 110 and the area value of the seated occupant on that seat 110.

The controller 150 determines the class of the seated occupant based on the determined area ratio, and in this case, the class determination of the seated occupant may be performed based on the comparison between the determined area ratio and the threshold values. The controller 150 may determine the class of the seated occupant as the second class at step S908 in response to the area ratio being equal to or greater than the first threshold value but less than the second threshold value (Yes at step S907), the third class at step S910 in response to the area ratio being equal to or greater than the second threshold value but less than the third threshold value (Yes at step S909), the fourth class at step S912 in response to the area ratio being equal to or greater than the third threshold value but less than the fourth threshold value (Yes at step S911), the fifth class at step S914 in response to the area ratio being equal to or greater than the fourth threshold value (Yes at step S913), and the first class at step S915 in response to the area ratio being less than the first threshold value (No at step S913). The process of determining the class of the seated occupant based on the comparison between the area ratio and the threshold values may be carried out in sequential order as described, but it may also be performed individually based on the satisfaction of each condition.

Although the present disclosure has been illustrated and described in connection with specific embodiments, it will be obvious to those skilled in the art that various modification and changes can be made thereto without departing from the scope of the present disclosure that is defined by the appended claims.

What is claimed is:

1. A seat belt wearing determination apparatus comprising:
a camera configured to capture an image of an occupant seated within a vehicle; and
a controller configured to determine a first bounding box and a second bounding box from the captured image and determine whether the seated occupant is wearing a seat belt based on a degree of overlapping between the first and second bounding boxes,
wherein the first bounding box captures an upper body region of the seated occupant, and the second bounding box captures the seat belt detected from the captured image, and
wherein the controller is further configured to compare the degree of overlapping with a predetermined threshold value to determine whether the seat belt is worn by the seated occupant.

2. The seat belt wearing determination apparatus of claim 1, wherein the controller is further configured to:
  detect, from the captured image, at least one predetermined point of the upper body region of the seated occupant; and
  determine the first bounding box based on the detected at least one predetermined point.

3. The seat belt wearing determination apparatus of claim 2, wherein the at least one predetermined point comprises a plurality of points respectively corresponding to both shoulders and an abdominal center of an upper body of the seated occupant.

4. The seat belt wearing determination apparatus of claim 3, wherein the controller is further configured to:
  determine a width of the first bounding box based on two of the plurality of points respectively corresponding to both shoulders of the seated occupant; and
  determine a height of the first bounding box based on at least one of the plurality of points.

5. The seat belt wearing determination apparatus of claim 1, wherein the controller is further configured to:
  extract seat belt characteristic information from the captured image;
  obtain classification information from the extracted seat belt characteristic information; and
  detect the seat belt based on the obtained classification information.

6. The seat belt wearing determination apparatus of claim 1, wherein the controller is further configured to determine that the seated occupant is not wearing the seat belt in response to the overlapping degree being equal to or less than the predetermined threshold value.

7. The seat belt wearing determination apparatus of claim 1, wherein the controller is further configured to:
  determine a class of the seated occupant; and
  determine the first bounding box based on the determined class of the seated occupant.

8. The seat belt wearing determination apparatus of claim 1, wherein, to determine at least one of the first and second bounding boxes, the controller is configured to input the captured image to an artificial intelligence algorithm, which includes at least one of machine learning, neural networks, deep learning and classification algorithms.

9. A seat belt wearing determination apparatus comprising:
  a camera configured to capture an image of an occupant seated within a vehicle; and
  a controller configured to determine a first bounding box and a second bounding box from the captured image and determine whether the seated occupant is wearing a seat belt based on a degree of overlapping between the first and second bounding boxes,
  wherein the first bounding box corresponds to an upper body region of the seated occupant, and the second bounding box includes the seat belt detected from the captured image,
  wherein the controller is further configured to:
    detect, from the captured image, at least one predetermined point of the upper body region of the seated occupant; and
    determine the first bounding box based on the detected at least one predetermined point, and
  wherein the controller is further configured to:
    in response to the at least one predetermined point being at least partially undetected, derive the undetected predetermined point from other detected predetermined points; and
    determine the first bounding box based on the derived point.

10. A seat belt wearing determination apparatus comprising:
  a camera configured to capture an image of an occupant seated within a vehicle; and
  a controller configured to determine a first bounding box and a second bounding box from the captured image and determine whether the seated occupant is wearing a seat belt based on a degree of overlapping between the first and second bounding boxes,
  wherein the first bounding box corresponds to an upper body region of the seated occupant, and the second bounding box includes the seat belt detected from the captured image,
  wherein the controller is further configured to:
    determine a class of the seated occupant; and
    determine the first bounding box based on the determined class of the seated occupant, and
  wherein the controller is further configured to:
    obtain a seat position of a seat of the vehicle;
    determine a first area value of the seat based on a parameter associated with the obtained seat position of the seat;
    detect the seated occupant from the captured image;
    determine a second area value of the seated occupant; and
    determine the class of the seated occupant based on an area ratio between the first and second area values.

11. The seat belt wearing determination apparatus of claim 10, wherein:
  the seat position comprises a front-rear direction position of the seat, and
  the parameter includes first and second parameters respectively correspond to frontmost and rearmost positions of the seat.

12. The seat belt wearing determination apparatus of claim 10, wherein:
  the seat position comprises a seat back recline angle of the seat, and
  the controller is further configured to determine the first area value of the seat further based on the recline angle of the seat.

13. The seat belt wearing determination apparatus of claim 10, wherein the controller is further configured to determine the class of the seated occupant as a predetermined class in response to the seated occupant being undetected from the captured image.

14. The seat belt wearing determination apparatus of claim 10, wherein the controller is further configured to:
  obtain seated occupant segmentation from the captured image; and
  determine the second area value of the seated occupant based on the obtained seated occupant segmentation.

15. The seat belt wearing determination apparatus of claim 10, wherein the controller is further configured to compare the area ratio and a predetermined threshold value to determine the class of the seated occupant.

16. The seat belt wearing determination apparatus of claim 15, wherein the controller is further configured to determine the class of the seated occupant based on a plurality of predetermined classes respectively having different ranges.

17. The seat belt wearing determination apparatus of claim 10, wherein the controller is further configured to obtain weight information of the seated occupant and determine the class of the seated occupant based on the obtained weight information.

18. The seat belt wearing determination apparatus of claim 17, wherein the controller is further configured to obtain the weight information of the seated occupant from a weight sensor connected to the seat.

19. The seat belt wearing determination apparatus of claim 10, wherein:
- the vehicle comprises a plurality of seats, and
- the controller is further configured to determine the area ratio for each seat, and determine the class of the seated occupant for each seat based on the area ratio determined for each seat.

* * * * *